United States Patent
Sugiura et al.

(10) Patent No.: US 12,258,533 B2
(45) Date of Patent: *Mar. 25, 2025

(54) SILICONE-BASED DEFOAMER COMPOSITION

(71) Applicant: DOW TORAY CO., LTD., Tokyo (JP)

(72) Inventors: Tsunehito Sugiura, Ichihara (JP); Kazuhiko Kojima, Ichihara (JP); Ikutaro Morikawa, Ichihara (JP); Takeshi Yoshizawa, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/269,827

(22) PCT Filed: Dec. 23, 2021

(86) PCT No.: PCT/JP2021/047974
§ 371 (c)(1),
(2) Date: Jun. 27, 2023

(87) PCT Pub. No.: WO2022/145348
PCT Pub. Date: Jul. 7, 2022

(65) Prior Publication Data
US 2024/0076572 A1 Mar. 7, 2024

(30) Foreign Application Priority Data
Dec. 28, 2020 (JP) ................. 2020-219094

(51) Int. Cl.
| | | |
|---|---|---|
| *C10M 155/02* | (2006.01) | |
| *B01D 19/04* | (2006.01) | |
| *C08G 77/46* | (2006.01) | |
| *C10M 125/26* | (2006.01) | |
| *C10M 161/00* | (2006.01) | |
| *C10M 173/02* | (2006.01) | |
| *C10N 30/02* | (2006.01) | |
| *C10N 30/18* | (2006.01) | |
| *C10N 40/20* | (2006.01) | |
| *C10N 50/00* | (2006.01) | |

(52) U.S. Cl.
CPC ....... *C10M 155/02* (2013.01); *B01D 19/0409* (2013.01); *C08G 77/46* (2013.01); *C10M 125/26* (2013.01); *C10M 161/00* (2013.01); *C10M 173/02* (2013.01); *C10M 2201/105* (2013.01); *C10M 2229/041* (2013.01); *C10M 2229/047* (2013.01); *C10N 2030/02* (2013.01); *C10N 2030/18* (2013.01); *C10N 2040/20* (2013.01); *C10N 2050/011* (2020.05)

(58) Field of Classification Search
CPC ............. C10M 155/02; C10M 125/26; C10M 161/00; C10M 173/02; C10M 2201/105; C10M 2229/041; C10M 2229/047; B01D 19/0409; C08G 77/46; C08G 77/12; C08G 77/14; C08G 77/20; C08G 77/38; C08G 77/50; C10N 2030/02; C10N 2030/18; C10N 2040/20; C10N 2050/011; C08K 2201/006; C08K 3/36; C08L 83/04; C08L 83/12

See application file for complete search history.

(56) References Cited

U.S. PATENT DOCUMENTS

| | | |
|---|---|---|
| 4,919,843 A | 4/1990 | Innertsberger et al. |
| 5,283,004 A | 2/1994 | Miura |
| 2003/0013808 A1 | 1/2003 | Tonge et al. |
| 2011/0021688 A1 | 1/2011 | Herzig et al. |
| 2011/0294714 A1 | 12/2011 | Delbrassinne et al. |
| 2015/0119509 A1 | 4/2015 | Brehm et al. |
| 2015/0240424 A1 | 8/2015 | Chao et al. |
| 2017/0087483 A1 | 3/2017 | Mitra et al. |
| 2017/0209813 A1 | 7/2017 | Kobayashi et al. |
| 2019/0224591 A1 | 7/2019 | Brehm et al. |
| 2022/0001301 A1 | 1/2022 | Grandl et al. |
| 2023/0037257 A1 | 2/2023 | Chao et al. |

FOREIGN PATENT DOCUMENTS

| | | | |
|---|---|---|---|
| CA | 2139057 A1 | 6/1995 | |
| EP | 2325262 A1 | 5/2011 | |
| JP | S63147507 A | 6/1988 | |
| JP | S6443312 A | 2/1989 | |
| JP | H7185212 A | 7/1995 | |
| JP | 2011104525 A | 6/2011 | |
| JP | 2014077218 A | 5/2014 | |
| JP | 2015085312 A | 5/2015 | |
| WO | WO-2006063234 A1 * | 6/2006 | ......... B01D 19/0404 |

OTHER PUBLICATIONS

English translation of International Search Report for PCT/JP2021/047962 dated Mar. 15, 2022, 2 pages.
English translation of International Search Report for PCT/JP2021/047974 dated Mar. 1, 2022, 2 pages.
Machine assisted English translation of JP2015085312A obtained from https://worldwide.espacenet.com/patent on Jun. 23, 2023, 18 pages.
Machine assisted English translation of JPS63147507A obtained from https://worldwide.espacenet.com/patent on Jun. 23, 2023, 7 pages.

* cited by examiner

*Primary Examiner* — Cephia D Toomer
(74) *Attorney, Agent, or Firm* — Warner Norcross + Judd LLP

(57) ABSTRACT

Provided is a silicone anti-foaming agent composition that not only has superior anti-foaming speed but also in which anti-foaming performance is not reduced when used repeatedly or over a long period. The composition comprises: a polyorganosiloxane polymer crosslinked product having a polyoxyalkylene group, which includes: moiety structure (I): $-R^1-(R^2_2SiO)_d-R^1$ (where $R^1$ represents an alkylene group bonded to a silicon atom on the polysiloxane chain, $R^2$ represents a monovalent hydrocarbon group, and d is 200 to 1000); and moiety structure (II): $-(C_eH_{2e})-O-(EO)_x-(PO)_y-(BO)_z-R^3$ (where a single bond on the left end is bonded to a silicon atom on the polysiloxane chain, $R^3$ represents a hydrogen atom, an alkyl group, an aryl group or an acyl group, e is 2 to 10, (x+y+z) is 40 to 100, x is 15 to 50, y is 15 to 50, and z is 0 to 50).

12 Claims, No Drawings

SILICONE-BASED DEFOAMER COMPOSITION

CROSS-REFERENCE TO RELATED APPLICATIONS

This application is the U.S. National Stage of PCT/JP2021/047974 filed on 23 Dec. 2021, which claims priority to Japanese Patent Application No. 2020-219094 filed on 28 Dec. 2020, the content of which is incorporated herein by reference.

TECHNICAL FIELD

The present invention relates to a silicone-based anti-foaming agent composition.

BACKGROUND ART

Anti-foaming agents are used in industrial processes, such as processes for treating or processing liquids and the like, in order to suppress the formation of foam. In particular, silicone-based anti-foaming agents are generally used because they are chemically stable and have low influence on a target to which they are applied.

Various types of silicone-based anti-foaming agents have been proposed. For example, Patent Document 1 describes a silicone anti-foaming agent composition containing a polyorganosiloxane having a specific general formula and having a viscosity of 20 cs to 100,000 cs at 25° C., a silane, and a finely powdered filler. Furthermore, Patent Document 2 describes a silicone anti-foaming agent composition including a first component containing a silicone-based anti-foaming agent and a second component containing a polyorganosiloxane polymer crosslinked product having a polyoxyalkylene group.

However, conventional anti-foaming agent compositions have a slow anti-foaming speed and may have insufficient initial anti-foaming performance. In addition, the anti-foaming performance may deteriorate when used repeatedly or for a relatively long period of time. Therefore, development of an anti-foaming agent composition having fast anti-foaming speed and superior anti-foaming retention where anti-foaming performance is not reduced even with repeated use is desirable. Furthermore, the dilution stability of the anti-foaming agent composition is not sufficient when the second component specifically described in Patent Document 2 is used, and thus further improvement is required.

PRIOR ART DOCUMENTS

Patent Documents

Patent Document 1 Japanese Unexamined Patent Application S63-147507
Patent Document 2 Japanese Unexamined Patent Application H7-185212

SUMMARY OF THE INVENTION

Problem to be Solved by the Invention

In order solve the problems with conventional technology described above, an object of the present invention is to provide a silicone anti-foaming agent composition that not only has superior anti-foaming speed but also in which anti-foaming performance is not reduced even when used repeatedly or over a long period and having super dilution stability.

Means for Solving the Problem

As a result of conducting diligent research on the problem described above, the present inventors arrived at the present invention. In other words, an object of the present invention is achieved by:

a silicone anti-foaming agent composition, comprising a polyorganosiloxane polymer crosslinked product having a polyoxyalkylene group, which includes:

moiety structure (I):
—$R^1$—$(R^2{}_2SiO)_d$—$R^1$—(where $R^1$ represents an alkylene group having 2 to 20 carbon atoms bonded to a silicon atom on the polysiloxane chain, $R^2$ represents a monovalent hydrocarbon group, and d is a number in the range of 200 to 1000); and moiety structure (II):

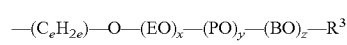

(where
EO represents an ethyleneoxy unit expressed by $C_2H_4O$,
PO represents a propyleneoxy unit expressed by $C_3H_6O$,
BO represents a butyleneoxy unit expressed by $C_4H_8O$,
a single bond on the left end is bonded to a silicon atom on the polysiloxane chain,
$R^3$ represents a hydrogen atom, an alkyl group, an aryl group or an acyl group,
e is a number ranging from 2 to 10,
x+y+z is a number ranging from 40 to 100,
x is a number ranging from 15 to 50,
y is a number ranging from 15 to 50, and
z is a number ranging from 0 to 50).

In the moiety structure (I), e is preferably a number ranging from 250 to 900.

In the moiety structure (II), x is preferably a number ranging from 20 to 40, y is preferably a number ranging from 20 to 40, and z is preferably zero.

The polyorganosiloxane polymer crosslinked product having a polyoxyalkylene group is preferably expressed by the following structural formula:

[Formula 1]

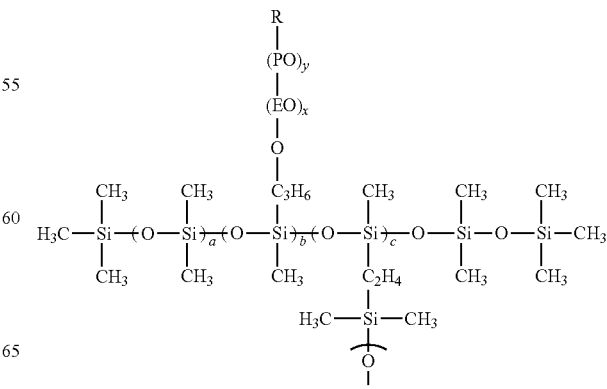

-continued

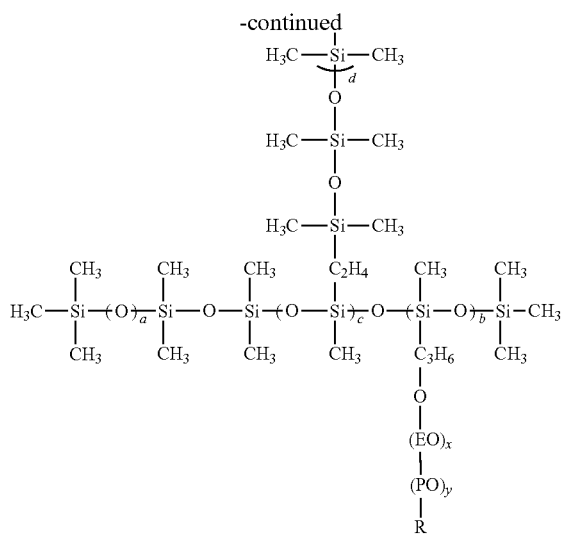

(where, a is a number ranging from 10 to 200,
b+c is a number ranging from 2 to 50,
b and c are each a number ranging from 1 or more,
EO and PO represent the same groups as described above,
R represents a hydrogen atom, an alkyl group, an aryl group or an acyl group, and
d, x and y are the same numbers as defined in the moiety structures (I) and (II)).

The silicone-based anti-foaming agent composition of the present invention preferably further contains a silicone-based anti-foaming agent oil compound, which includes:
(A) an essentially hydrophobic organopolysiloxane having a viscosity of 10 to 100,000 mPa·s at 25° C.: 20 to 80 parts by mass;
(B) a hydrophobic organopolysiloxane or a cyclic organopolysiloxane containing silanol groups at least at both ends: 20 to 80 parts by mass;
(C) a silane or silane condensation product: 1 to 10 parts by mass; and
(D) a fine powder silica having a specific surface area of 50 m²/g or more: 2 to 10 parts by mass, wherein
the total amount of (A) and (B) is 100 parts by mass.
Component (B) preferably includes:
(B1) a hydrophobic organopolysiloxane containing a silanol group at both ends and having a viscosity of 1000 to 10,000,000 mPa·s; and
(B2) a hydrophobic organopolysiloxane or cyclic siloxane containing silanol groups at both ends and having a viscosity of 1 to 1000 mPa·s.

The molar ratio of component (B) relative to the total amount of component (A) and component (B) is preferably 0.7 or more.

The molar ratio of component (B1) relative to the total amount of component (A) and component (B1) is preferably 0.2 or more.

The silicone-based anti-foaming agent oil compound is preferably emulsified by the polyorganosiloxane polymer crosslinked product having a polyoxyalkylene group.

The silicone-based anti-foaming agent oil compound preferably has a viscosity of 10,000 to 1,000,000 mPa·s at 25° C.

The particle diameter of an emulsion of the silicone anti-foaming agent composition of the present invention is preferably 0.1 to 10 μm.

The silicone anti-foaming agent composition of the present invention is preferably used in a metalworking oil.

EFFECTS OF THE INVENTION

The silicone anti-foaming agent composition of the present invention provides superior anti-foaming speed. Therefore, an anti-foaming agent composition having not only superior initial anti-foaming performance, but also anti-foaming performance that is not significantly reduced even with repeated or long term use is achieved.

MODE FOR CARRYING OUT THE INVENTION

A silicone anti-foaming agent composition of the present invention contains a
polyorganosiloxane polymer crosslinked product having a polyoxyalkylene group, which includes:
moiety structure (I):
—$R^1$—$(R^2_2SiO)_d$—$R^1$—(where $R^1$ represents an alkylene group having 2 to 20 carbon atoms bonded to a silicon atom on the polysiloxane chain, $R^2$ represents a monovalent hydrocarbon group, and d is a number in the range of 200 to 1000); and
moiety structure (II):

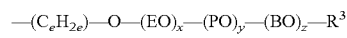

(where
EO represents an ethyleneoxy unit expressed by $C_2H_4O$,
PO represents a propyleneoxy unit expressed by $C_3H_6O$,
BO represents a butyleneoxy unit expressed by $C_4H_8O$,
a single bond on the left end is bonded to a silicon atom on the polysiloxane chain,
$R^3$ represents a hydrogen atom, an alkyl group, an aryl group or an acyl group,
e is a number ranging from 2 to 10,
x+y+z is a number ranging from 40 to 100,
x is a number ranging from 15 to 50,
y is a number ranging from 15 to 50, and
z is a number ranging from 0 to 50).

In the moiety structure (I), $R^1$ represents an alkylene group having 2 to 20 carbon atoms bonded to a silicon atom on the polysiloxane chain. The alkylene group having 2 to 20 carbon atoms may be straight-chain or branched-chain, and examples include: a methylmethylene group, ethylene group, methylethylene group, propylene group, butylene group, pentylene group, hexylene group, heptylene group, and octylene group.

In the moiety structure (I), $R^2$ represents a monovalent hydrocarbon group. $R^2$ represents one or more unsubstituted or substituted monovalent hydrocarbon groups having 1 to 18 carbon atoms, and particularly 1 to 15 carbon atoms, which may be the same or different. Specific examples of monovalent hydrocarbon groups for $R^2$ include methyl groups, ethyl groups, propyl groups, isopropyl groups, butyl groups, isobutyl groups, pentyl groups, hexyl groups, heptyl groups, octyl groups, nonyl groups, decyl groups, dodecyl groups, tridecyl groups, tetradecyl groups, hexadecyl groups, octadecyl groups, and other alkyl groups, cyclohexyl groups and other cycloalkyl groups, vinyl groups, allyl groups, and other alkenyl groups, phenyl groups, tolyl groups, and other aryl groups, styryl groups, α-methylstyryl groups, and other aralkyl groups, chloromethyl groups, 3-chloropropyl groups, 3,3,3-trifluoropropyl groups, cyanoethyl groups, 3-aminopropyl groups, N-(β-aminoethyl)-γ-aminopropyl groups, and the like in which a part or all of hydrogen atoms bonded to a carbon atom of these groups are substituted with a halogen atom, cyano group, amino group, hydroxyl group, or the like.

In the moiety structure (I), d is a number ranging from 200 to 1000, preferably a number ranging from 250 to 900, and more preferably a number ranging from 270 to 800. In the present invention, by selecting the aforementioned range for d and combining with a specific range of chain lengths of (EO) (PO) in a moiety structure (II) described later, the anti-foaming performance and dilution stability of the anti-foaming agent emulsified by the polyorganosiloxane polymer crosslinked product having a polyoxyalkylene group are greatly improved.

The moiety structure (II) is one characteristic structure of the present invention and expresses a polyoxyalkylene group bonded to a silicon atom via an alkylene group having e number of carbon atoms, necessarily containing a certain number of ethyleneoxy units and a certain number of propyleneoxy units, and optionally further containing a butyleneoxy unit. More specifically, in the moiety structure (II), EO represents an ethyleneoxy unit expressed by $C_2H_4O$, preferably an ethyleneoxy unit expressed by $CH_2CH_2O$. PO represents a propyleneoxy unit expressed by $C_3H_6O$, and may be and is preferably either a propyleneoxy unit expressed by $CH_2CH(CH_3)O$ or $CH_2CH_2CH_2O$. BO represents a butyleneoxy unit expressed by $C_4H_8O$, and similar to the propyleneoxy unit, BO may have either a straight-chain or branched butylene structure. $R^3$ represents a hydrogen atom, an alkyl group, an aryl group or an acyl group. The alkyl group may be an unsubstituted or substituted alkyl group having 1 to 18 carbon atoms, and particularly 1 to 15 carbon atoms, and examples include: a methyl group, ethyl group, propyl group, isopropyl group, butyl group, isobutyl group, pentyl group, hexyl group, heptyl group, octyl group, nonyl group, decyl group, dodecyl group, tridecyl group, tetradecyl group, hexadecyl group, and octadecyl group. The aryl group may be an aryl group having 6 to 20 carbon atoms, and examples include phenyl groups and tolyl groups. The acyl group may be an acyl group having 2 to 12 carbon atoms, and examples include acetyl groups, propionyl groups, and benzoyl groups.

In the moiety structure (II), e is a number ranging from 2 to 10, and preferably a number ranging from 3 to 8. Note that an alkylene group having e number of carbon atoms, and preferably an alkylene group having 3 to 8 carbon atoms, expressed by $C_eH_{2e}$ may have a partially branched structure or a straight-chain structure.

In the moiety structure (II), x+y+z is a number ranging from 40 to 100, x is a number ranging from 15 to 50, y is a number ranging from 15 to 50, and z is a number ranging from 0 to 50. Preferably, x is a number ranging from 20 to 45, y is a number ranging from 20 to 45, and z is a number ranging from 0 to 25. More preferably, x is a number ranging from 20 to 40, y is a number ranging from 20 to 40, and z is zero. In the present invention, by selecting the aforementioned range for x, y and x+y (z may be 0), and emulsifying with a polyorganosiloxane polymer crosslinked product and combining with a polysiloxane structure having a chain length in a specific range in the moiety structure (I) described above, the anti-foaming performance and dilution stability of an anti-foaming agent emulsified by the polyorganosiloxane polymer crosslinked product having a polyoxyalkylene group are greatly improved.

The polyorganosiloxane polymer crosslinked product having a polyoxyalkylene group containing the moiety structure (I) and moiety structure (II) is preferably expressed by the following structural formula:

[Formula 2]

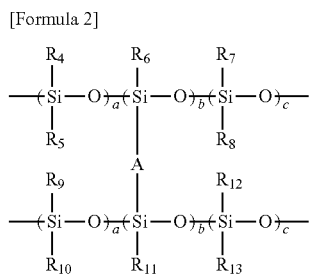

In the formula, A represents the moiety structure (I): $—R^1—(R^2_2SiO)_d—R^1—$, and $R^4$ to $R^7$ and $R^9$ to $R^{12}$ each independently represent a monovalent hydrocarbon group. $R^8$ and $R^{13}$ represent the moiety structure (II): $—(C_eH_{2e})—O—(EO)_x—(PO)_y—(BO)_z—R^3$. Furthermore, preferred ranges of variables a to c representing the number of repetitions are as follows.

a: $1 \leq a \leq 1000$, preferably $1 \leq a \leq 500$, and most preferably $1 \leq a \leq 250$
b: $0 < b \leq 30$, preferably $0 < b \leq 20$, and most preferably $0 < b \leq 15$
c: $1 \leq c \leq 20$, preferably $1 \leq c \leq 15$, and most preferably $0 \leq c \leq 10$ The monovalent hydrocarbon groups of $R^4$ to $R^7$ and $R^9$ to $R^{12}$ represent one or more unsubstituted or substituted monovalent hydrocarbon groups having 1 to 18 carbon atoms, and particularly 1 to 15 carbon atoms, which may be the same or different. Specific examples of monovalent hydrocarbon groups for $R^2$ include methyl groups, ethyl groups, propyl groups, isopropyl groups, butyl groups, isobutyl groups, pentyl groups, hexyl groups, heptyl groups, octyl groups, nonyl groups, decyl groups, dodecyl groups, tridecyl groups, tetradecyl groups, hexadecyl groups, octadecyl groups, and other alkyl groups, cyclohexyl groups and other cycloalkyl groups, vinyl groups, allyl groups, and other alkenyl groups, phenyl groups, tolyl groups, and other aryl groups, styryl groups, α-methylstyryl groups, and other aralkyl groups, chloromethyl groups, 3-chloropropyl groups, 3,3,3-trifluoropropyl groups, cyanoethyl groups, 3-aminopropyl groups, N-(β-aminoethyl)-γ-aminopropyl groups, and the like in which a part or all of hydrogen atoms bonded to a carbon atom of these groups are substituted with a halogen atom, cyano group, amino group, hydroxyl group, or the like. An alkyl group is preferred, and a methyl group is particularly preferred.

The polyorganosiloxane polymer crosslinked product having a polyoxyalkylene group containing the moiety structure (I) and moiety structure (II) is preferably expressed by the following structural formula:

[Formula 3]

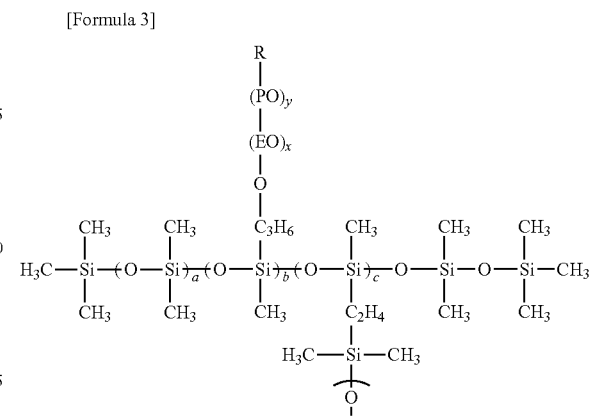

-continued

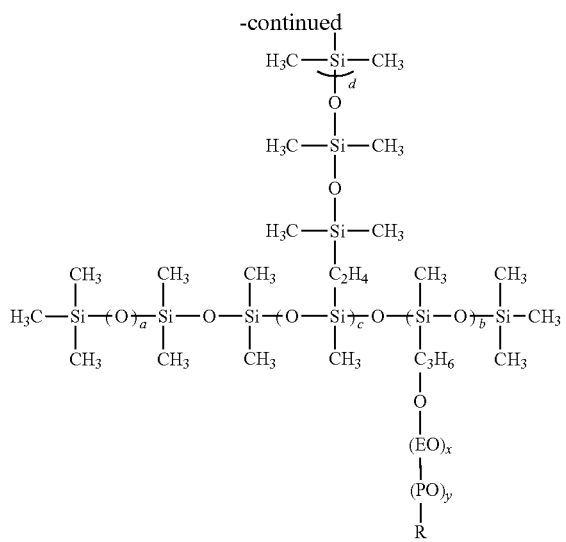

(where a is a number ranging from 10 to 200,
b+c is a number ranging from 2 to 50,
b and c are each a number of 1 or more,
EO and PO represent the same groups as described above,
R represents a hydrogen atom, an alkyl group, an aryl group or an acyl group, and
d, x and y are the same numbers as defined in the moiety structures (I) and (II)).

In the structural formula described above, R represents the same groups as $R^3$ in moiety structure (II), and represents a hydrogen atom, an alkyl group, an aryl group, or an acyl group. The alkyl group may be an unsubstituted or substituted alkyl group having 1 to 18 carbon atoms, and particularly 1 to 15 carbon atoms, and examples include: a methyl group, ethyl group, propyl group, isopropyl group, butyl group, isobutyl group, pentyl group, hexyl group, heptyl group, octyl group, nonyl group, decyl group, dodecyl group, tridecyl group, tetradecyl group, hexadecyl group, and octadecyl group. The aryl group may be an aryl group having 6 to 20 carbon atoms, and examples include phenyl groups and tolyl groups. The acyl group may be an acyl group having 2 to 12 carbon atoms, and examples include acetyl groups, propionyl groups, and benzoyl groups.

The polyorganosiloxane polymer crosslinked product having a polyoxyalkylene group included in the silicone anti-foaming agent composition of the present invention is obtained by the following reaction.

Addition reaction of the following components (a) and (b):
Component (a): Polyorganosiloxane having two or more Si-H groups in a side chain in one molecule
Component (b): Polyorganosiloxane blocked with vinyl or alkenyl groups at both ends Specifically, the polyorganosiloxane polymer crosslinked product having a polyoxyalkylene group can be manufactured by:
(i) a step of hydrosilylation reacting a polyorganosiloxane having two or more Si—H groups in a side chain per one molecule and a polyorganosiloxane blocked at both ends with a vinyl group or alkenyl group in isopropyl alcohol or toluene using a platinum catalyst to obtain crosslinked siloxane;
(ii) a step of reacting the product obtained in step (i) with an allyl polyether in isopropyl alcohol or toluene using a platinum catalyst to obtain a crosslinked polyether-modified silicone; and (iii) a step of heating to 100 to 150° C. under reduced pressure to remove the reaction solvent. Note that steps (i) and (ii) can be performed at a temperature of 80 to 100° C.

With the polyorganosiloxane polymer crosslinked product having a polyoxyalkylene group included in the silicone anti-foaming agent composition of the present invention, component (a) and component (b) described above react and an addition reaction of the Si-H group and vinyl group or alkenyl group thereof forms a three-dimensional crosslinked structure, and flowability is achieved. Herein, the three-dimensional crosslinked structure represents a structure in which two or more polyorganosiloxane molecules are bonded via two or more branched structures.

The method for obtaining a specific siloxane crosslinked product having the characteristics described above is not limited, and may be a method of obtaining a crosslinked product of a polyorganosiloxane polymer and adding a polyoxyalkylene group, or a method of obtaining a straight-chain polyorganosiloxane to which a polyoxyalkylene group is added.

The polyorganosiloxane polymer crosslinked product having a polyoxyalkylene group included in the silicone anti-foaming agent composition of the present invention preferably has a viscosity of 100 to 100,000 mPa·s at 25° C.

The silicone anti-foaming agent composition of the present invention preferably further contains a silicone-based anti-foaming agent oil compound, which includes:
(A) an essentially hydrophobic organopolysiloxane having a viscosity of 10 to 100,000 mPa·s at 25° C.: 20 to 80 parts by mass;
(B) a hydrophobic organopolysiloxane or a cyclic organopolysiloxane containing silanol groups at least at both ends: 20 to 80 parts by mass;
(C) a silane or silane condensation product: 1 to 10 parts by mass; and
(D) a fine powder silica having a specific surface area of 50 m 2/g or more: 2 to 10 parts by mass, wherein
the total amount of (A) and (B) is 100 parts by mass.

[Essentially hydrophobic organopolysiloxane with viscosity of 10 to 100,000 mPa·s at 25° C.]

The organopolysiloxane of component (A) is essentially hydrophobic. Herein, "essentially hydrophobic" means that the organopolysiloxane as a whole exhibits hydrophobicity even if some functional groups contain a hydrophilic group.

The essentially hydrophobic organopolysiloxane (A) may be either straight-chain or branched, and is preferably expressed by the following average composition formula (I).

In formula (I) above, $R^1$ represents one or more unsubstituted or substituted monovalent hydrocarbon groups having 1 to 18 carbon atoms, and particularly 1 to 15 carbon atoms, which may be the same or different. Specific examples of monovalent hydrocarbon groups for $R^1$ include methyl groups, ethyl groups, propyl groups, isopropyl groups, butyl groups, isobutyl groups, pentyl groups, hexyl groups, heptyl groups, octyl groups, nonyl groups, decyl groups, dodecyl groups, tridecyl groups, tetradecyl groups, hexadecyl groups, octadecyl groups, and other alkyl groups, a cyclohexyl group and other cycloalkyl groups, vinyl groups, allyl groups, and other alkenyl groups, phenyl groups, tolyl groups, and other aryl groups, styryl groups, α-methylstyryl groups, and other aralkyl groups, or chloromethyl groups, 3-chloropropyl groups, 3,3,3-trifluoropropyl groups, cyanoethyl groups, 3-aminopropyl groups, N-(β-aminoethyl)-γ-aminopropyl groups, and the like in which a part or all of the hydrogen atoms bonded to the carbon atoms of these groups are substituted with a halogen atom, cyano groups, amino groups, hydroxyl groups, or the like. From the perspective of anti-foaming and cost, 80 mol % or more, and particularly 90 mol % or more, of all $R^1$ are preferably methyl groups.

g is a positive number where $1.9 \leq g \leq 2.2$, and preferably $1.95 \leq g \leq 2.15$.

Note that an organopolysiloxane end may be blocked with an organosilyl group expressed by $R^1{}_3Si$ or may be blocked with a diorganohydroxysilyl group expressed by $(HO)R^1{}_2Si$.

(A) The viscosity at 25° C. of the essentially hydrophobic organopolysiloxane measured by a rotational viscometer is 10 to 100,000 mPa·s. From the perspective of anti-foaming speed and retention of anti-foaming performance, the viscosity is 100 to 100,000 mPa·s, preferably 2,500 to 50,000 mPa·s, more preferably 3,000 to 45,000 mPa·s, and most preferably 4,000 to 40,000 mPa·s. If less than the lower limit, anti-foaming performance may be reduced, and if above the upper limit, the viscosity of the silicone-based anti-foaming agent oil compound may increase and deteriorate workability.

Component (A) is typically manufactured by ring-opening polymerization of cyclic low molecular weight siloxane such as octamethylcyclotetrasiloxane or the like using a catalyst. After polymerization, the component contains a cyclic low molecular weight siloxane serving as a raw material, which is preferably distilled off under heating and reduced pressure while venting an inert gas during the generation of a reaction.

Specific structures of component (A) include, but are not limited to, those shown below and the like. Note that in the formulae, Me, Vi, and Ph represent a methyl group, a vinyl group, and a phenyl group, respectively.

[Formula 4]

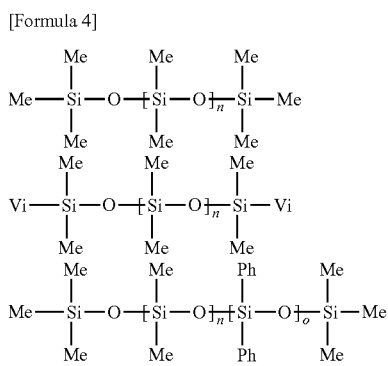

(where $n \geq 10$ and $o \geq 1$.)

Component (A) may be a single essentially hydrophobic organopolysiloxane having a viscosity of 10 to 100,000 mPa·s at 25° C., or two or more thereof may be used in combination.

[Hydrophobic organopolysiloxane or cyclic organopolysiloxane containing silanol group at least at both ends]

The organopolysiloxane of component (B) is hydrophobic or is cyclic and contains silanol groups at least at both ends. Herein, the term "hydrophobic" means that the organopolysiloxane as a whole exhibits hydrophobicity even if some of the functional groups contain a hydrophilic group, as in the case of component (A).

The hydrophobic organopolysiloxane (B) containing silanol groups at least at both ends may be straight-chain or branched, and is suitably expressed by the following average composition formula (II).

In formula (II) above, $R^2$ represents one or more unsubstituted or substituted monovalent hydrocarbon groups having 1 to 18 carbon atoms, and particularly 1 to 15 carbon atoms, which may be the same or different. Specific examples of monovalent hydrocarbon groups for $R^2$ include methyl groups, ethyl groups, propyl groups, isopropyl groups, butyl groups, isobutyl groups, pentyl groups, hexyl groups, heptyl groups, octyl groups, nonyl groups, decyl groups, dodecyl groups, tridecyl groups, tetradecyl groups, hexadecyl groups, octadecyl groups, and other alkyl groups, cyclohexyl groups and other cycloalkyl groups, vinyl groups, allyl groups, and other alkenyl groups, phenyl groups, tolyl groups, and other aryl groups, styryl groups, α-methylstyryl groups, and other aralkyl groups, chloromethyl groups, 3-chloropropyl groups, 3,3,3-trifluoropropyl groups, cyanoethyl groups, 3-aminopropyl groups, N-(β-aminoethyl)-γ-aminopropyl groups, and the like in which a part or all of hydrogen atoms bonded to a carbon atom of these groups are substituted with a halogen atom, cyano group, amino group, hydroxyl group, or the like. $R^3$ represents one or more hydrogen atoms or monovalent hydrocarbon groups having 1 to 18 carbon atoms, and particularly 1 to 15 carbon atoms, which may be the same or different.

The average value of p+q is preferably 1.9 to 2.2, where q is a sufficient value to provide silanol groups at both ends, and at least one OH group is present at each end.

The structure of the cyclic siloxane is not particularly limited, and examples thereof include those expressed by the following average composition formula (III).

[Formula 5]

In formula (III) above, $R^4$ represents one or more unsubstituted or substituted monovalent hydrocarbon groups having 1 to 15 carbon atoms, and particularly 1 to 10 carbon atoms, which may be the same or different. Specific examples of monovalent hydrocarbon groups for $R^4$ include methyl groups, ethyl groups, propyl groups, isopropyl groups, butyl groups, isobutyl groups, pentyl groups, hexyl groups, heptyl groups, octyl groups, nonyl groups, decyl groups, dodecyl groups, tridecyl groups, tetradecyl groups, and other alkyl groups, a cyclohexyl group and other cycloalkyl groups, vinyl groups, allyl groups, and other alkenyl groups, phenyl groups, tolyl groups, and other aryl groups, styryl groups, α-methylstyryl groups, and other aralkyl groups, or chloromethyl groups, 3-chloropropyl groups, 3,3,3-trifluoropropyl groups, cyanoethyl groups, 3-am inopropyl groups, N-(β-aminoethyl)-γ-aminopropyl groups, and the like in which a part or all of the hydrogen atoms bonded to the carbon atoms of these groups are substituted with a halogen atom, cyano groups, amino groups, hydroxyl groups, or the like.

r is preferably an integer of 3 to 20, and more preferably an integer of 3 to 10.

In particular, component (B) preferably includes:
(B1) a hydrophobic organopolysiloxane containing silanol groups at both ends and having a viscosity of 1000 to 10,000,000 mPa·s; and (B2) a hydrophobic organopolysiloxane or cyclic siloxane containing silanol groups at both ends and having a viscosity of 1 to 1000 mPa·s.

The viscosity of (B1) hydrophobic organopolysiloxane containing silanol groups at both ends at 25° C. measured using a rotational viscometer is preferably 2,000 to 1,000,000 mPa·s, and more preferably 5,000 to 100,000 mPa·s. In addition, the viscosity of (B2) hydrophobic organopolysiloxane containing silanol groups at both ends at 25° C. measured using a rotational viscometer is preferably 5 to 500 mPa·s, and more preferably 10 to 100 mPa·s.

Component (B) can be used in an amount of 20 to 80 parts by mass based on 20 to 80 parts by mass of component (A), where the total amount of components (A) and (B) is 100 parts by mass. Preferably, component (B) can be used in an amount of 30 to 70 parts by mass based on 30 to 70 parts by mass of component (A), where the total amount of components (A) and (B) is 100 parts by mass.

The molar ratio of component (B) to the total amount of component (A) and component (B) is 0.7 or more, preferably 0.75 or more, and more preferably 0.8 or more.

The molar ratio of component (B1) to the total amount of component (A) and component (B1) is 0.2 or more, preferably 0.25 or more, and more preferably 0.3 or more.

[Silane or silane condensation product]

The structure of component (C) silane or silane condensation product is not particularly limited, and examples thereof include those expressed by the following average composition formula (IV).

$$R^5_s SiX_{4-s} \quad (IV)$$

In formula (IV) above, $R^5$ represents one or more unsubstituted or substituted monovalent hydrocarbon groups having 1 to 15 carbon atoms, and particularly 1 to 10 carbon atoms, which may be the same or different. Specific examples of monovalent hydrocarbon groups for $R^5$ include methyl groups, ethyl groups, propyl groups, isopropyl groups, butyl groups, isobutyl groups, pentyl groups, hexyl groups, heptyl groups, octyl groups, nonyl groups, decyl groups, dodecyl groups, tridecyl groups, tetradecyl groups, and other alkyl groups, a cyclohexyl group and other cycloalkyl groups, vinyl groups, allyl groups, and other alkenyl groups, phenyl groups, tolyl groups, and other aryl groups, styryl groups, α-methylstyryl groups, and other aralkyl groups, or chloromethyl groups, 3-chloropropyl groups, 3,3,3-trifluoropropyl groups, cyanoethyl groups, 3-aminopropyl groups, N-(β-aminoethyl)-γ-aminopropyl groups, and the like in which a part or all of the hydrogen atoms bonded to the carbon atoms of these groups are substituted with a halogen atom, cyano groups, amino groups, hydroxyl groups, or the like.

X represents a hydrolyzable group, for example —OR', —OYOR', —NR'R", —ON=CR'R", —OOCR', —OCR'=CR'R", —ONR'R", and —NR'—CO—R". R' and R" represent one or more hydrogen or monovalent hydrocarbon groups, and examples of monovalent hydrocarbon groups include the same groups as those for $R^5$. Y represents an unsubstituted or substituted divalent hydrocarbon group having 1 to 15 carbon atoms, and particularly 1 to 10 carbon atoms, such as an alkylene group. In addition, R' and R" in —ON=CR'R" may bond to form the following structure.

[Formula 6]

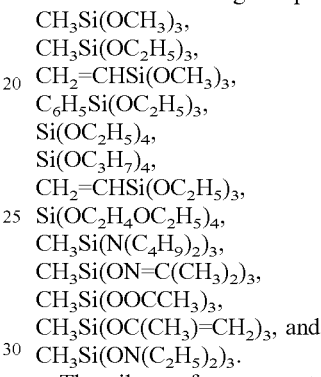

In the formula, Z represents an unsubstituted or substituted divalent hydrocarbon group having 1 to 15 carbon atoms, and particularly 1 to 10 carbon atoms, such as an alkylene group.

The average value of s is 1 or less, thus meaning that this is a single substance or mixture of $R^5 SiX_3$ or $SiX_4$.

The silane of component (C) is a compound well known to a person of ordinary skill in the art, and examples thereof include the following compounds.

$CH_3 Si(OCH_3)_3$,
$CH_3 Si(OC_2H_5)_3$,
$CH_2=CHSi(OCH_3)_3$,
$C_6H_5 Si(OC_2H_5)_3$,
$Si(OC_2H_5)_4$,
$Si(OC_3H_7)_4$,
$CH_2=CHSi(OC_2H_5)_3$,
$Si(OC_2H_4OC_2H_5)_4$,
$CH_3 Si(N(C_4H_9)_2)_3$,
$CH_3 Si(ON=C(CH_3)_2)_3$,
$CH_3 Si(OOCCH_3)_3$,
$CH_3 Si(OC(CH_3)=CH_2)_3$, and
$CH_3 Si(ON(C_2H_5)_2)_3$.

The silane of component (C) may also be a partially hydrolyzed condensate thereof.

As component (C), the silanes or silane condensation products above may be used alone, or two or more thereof may be used in combination.

Component (C) can be used in an amount of 1 to 10 parts by mass, and preferably 2 to 5 parts by mass, relative to a total of 100 parts by mass of components (A) and (B).

[Fine powder silica having specific surface area of 50 m²/g or more]

Fine powder silica as component (D), is desirably hydrophilic silica such as fumed silica, precipitated silica, or the like, which may be used alone or in combination of two or more. In addition, the specific surface area (BET method) of the fine powder silica is 50 m²/g or more, preferably 100 to 700 m²/g, and more preferably 150 to 500 m²/g. By setting the specific surface area to 50 m²/g or more, preferred anti-foaming performance can be achieved.

Examples of the commercially available components (D) that can be used in the present invention include: AEROSIL (registered trademark) 300 (hydrophilic fumed silica having a BET specific surface area of 300 m²/g), AEROSIL (registered trademark) 200 (hydrophilic fumed silica having a BET specific surface area of 200 m²/g) available from Nippon Aerosil Co. Ltd., NIPSIL (registered trademark) L-250 (hydrophilic precipitated silica having a BET specific surface area of 170 m²/g) available from TOSOH SILICA CORPORATION, and the like.

The proportion of component (D) is 2 to 10 parts by mass, and preferably 3 to 5 parts by mass, relative to a total of 100 parts by mass of components (A) and (B). If less than 2 parts by mass, sufficient anti-foaming performance cannot be achieved, and if above 10 parts by mass, the resulting silicone-based anti-foaming agent oil compound has increased viscosity and inferior workability.

[Manufacturing method of silicone-based anti-foaming agent oil compound]

The silicone-based anti-foaming agent oil compound can be manufactured by a method including:
(1) a step of kneading all or part of the components of the silicone-based anti-foaming agent oil compound;
(2) a step of heat-treating the kneaded product obtained in step (1) at 50 to 300° C.;
(3) a step of adding an alkali catalyst or an acid catalyst to the kneaded product obtained in step (2), and kneading;
(4) a step of adding, if present, remaining components of the silicone-based anti-foaming agent oil compound to the kneaded product obtained in step (3), and kneading; and
(5) a step of neutralizing the catalyst in the kneaded product obtained in step (4).

The alkali catalyst or acid catalyst used in step (3) in the method for manufacturing a silicone-based anti-foaming agent oil compound is not particularly limited. An oxide, hydroxide, alkoxide, or silanolate of an alkali metal or alkaline earth metal that is a well-known alkali catalyst used for an equilibrium reaction of a polysiloxane can be used as the alkali catalyst and preferred examples include potassium silanolate and potassium hydroxide. In addition, examples of acid catalysts include: acetic acid, butyric acid, maleic acid, citric acid, and other organic acids, hydrochloric acid, nitric acid, phosphoric acid, sulfuric acid, and other inorganic acids; and the like. The catalyst is more preferably an alkali catalyst rather than an acid catalyst.

The amount of alkali catalyst or acid catalyst used is 0.001 to 5 parts by mass per 100 parts by mass of component (A) preferably 0.01 to 5 parts by mass, more preferably 0.01 to 3 parts by mass, and even more preferably 0.05 to 3 parts by mass. If the amount is less than 0.001 parts by mass, a sufficient catalytic effect cannot be achieved, and if the amount exceeds 5 parts by mass, the effect of the catalyst is be greatly improved, which is disadvantageous in terms of cost.

Regarding neutralizing agents used in step (5) of the method of manufacturing the silicone-based anti-foaming agent oil compound, examples of neutralizing agents for an alkali catalyst include: hydrochloric acids, sulfuric acids, nitric acids, phosphoric acids, acetic acids, and carboxylic acids that are solid at room temperature. A carboxylic acid that is solid at room temperature is preferable. Examples of carboxylic acids that are solid at room temperature include: monocarboxylic acids such as benzoic acid and the like; dicarboxylic acids such as oxalic acid, malonic acid, succinic acid, glutaric acid, adipic acid, phthalic acid, isophthalic acid, terephthalic acid, and the like; and tricarboxylic acids such as citric acid, isocitric acid, oxalosuccinic acid, aconitic acid, and the like. Of these, succinic acid, which has a small acid dissociation constant, is strong as an acid, and is easy to obtain, is preferable. Examples of neutralizing agents for the acid catalyst include: alkali metal or alkaline earth metal oxides, hydroxides, alkoxides, and silanolates, while potassium silanolate and potassium hydroxide are preferred. Note that the amount of the neutralizing agent to be used may be any amount that can neutralize the alkali catalyst or acid catalyst described above.

In step (1) in the method of manufacturing the silicone-based anti-foaming agent oil compound, components (A) to (C) or components (A) to (D) are kneaded at a temperature of preferably 100° C. or lower, and more preferably 80° C. or lower. No particular external heating is required, kneading can be performed at room temperature (for example, 10 to 30° C.), and the temperature increased by heat generation in the system due to frictional resistance generated during kneading is preferably maintained at 100° C. or lower, and more preferably at 80° C. or lower. The processing time of step (1) depends greatly on the kneading device and scale, and therefore cannot be defined unconditionally, but is typically 0.1 to 3 hours, and particularly preferably about 0.5 to 2 hours.

In step (2) in the method of manufacturing a silicone-based anti-foaming agent oil compound, the kneaded product obtained in step (1) is heat treated at 50 to 300° C., and preferably 70 to 200° C., and preferably while kneading. By setting the heat treatment temperature within the range above, superior anti-foaming performance can be achieved. The processing time of step (2) depends greatly on the kneading device and scale, and therefore cannot be defined unconditionally, but is typically is 0.1 to 4 hours, and particularly preferably about 0.5 to 2 hours.

In step (3) in the method of manufacturing a silicone-based anti-foaming agent oil compound, an alkali catalyst or acid catalyst is added to the kneaded product obtained in step (2) and then kneaded to make the system of the oil compound alkaline or acidic. Step (3) can be performed at 10 to 300° C., and preferably 20 to 200° C. The processing time of step (3) also depends greatly on the kneading device and scale, and therefore cannot be defined unconditionally, but is typically 0.05 to 3 hours, and particularly preferably about 0.1 to 2 hours.

Step (4) in the method of manufacturing a silicone-based anti-foaming agent oil compound is a step in which any remaining components of the silicone-based anti-foaming agent oil compound, for example, a part of component (B) or component (D), if present, are added to the kneaded product obtained in step (3) and then kneaded, and is a step for solidifying reactive groups of each component on the surface of the fine powder silica. Step (4) can be performed at 50 to 300° C., and preferably 70 to 200° C. The processing time of step (4) also depends greatly on the kneading device and scale, and therefore cannot be defined unconditionally, but is typically 0.05 to 6 hours, and particularly preferably about 0.1 to 4 hours.

Step (5) in the method of manufacturing a silicone-based anti-foaming agent oil compound is a step of neutralizing the catalyst in the kneaded product obtained in step (4) at 10 to 300° C., and preferably at 20 to 200° C. The processing time of step (3) also depends greatly on the kneading device and scale, and therefore cannot be defined unconditionally, but is typically 0.1 to 4 hours, and particularly preferably about 0.5 to 3 hours.

In the method of manufacturing a silicone-based anti-foaming agent oil compound, examples of a kneading machine used for kneading include: planetary mixers, kneaders, pressure kneaders, twin-screw kneaders, intensive mixers, agitation homomixers, dispersion mixers, planetary dispersion mixers, and the like, but are not particularly limited. These kneading machines can be used in any of steps (1) to (5).

Herein, the ultimately obtained silicone-based anti-foaming agent oil compound has a viscosity at 25° C. measured using a rotational viscometer of 10,000 to 1,000,000 mPa·s, preferably 20,000 to 100,000 mPa·s, and more preferably 30,000 to 50,000 mPa·s.

In the silicone anti-foaming agent composition of the present invention, the silicone-based anti-foaming agent oil compound is preferably emulsified with a polyorganosiloxane polymer crosslinked product having a polyoxyalkylene group containing moiety structure (I) and moiety structure (II). The viscosity of the anti-foaming agent may be designed as appropriate according to emulsification conditions, viscosity, and the like thereof.

The polyorganosiloxane polymer crosslinked product having a polyoxyalkylene group containing moiety structures (I) and (II) may be used alone or in a mixture of two or more, and the amount thereof is preferably 5 to 95 mass %, and more preferably 10 to 70 mass %, based on the entire silicone anti-foaming agent composition. If the amount is too high, the anti-foaming performance of the anti-foaming agent composition may deteriorate. Note that when added, an effective amount can be used, but it is preferably added in an amount of 20 mass % or more.

In addition, silicone anti-foaming agent compositions may include: polyoxyalkylene polymers expressed by
HO—[PO]$_{35}$—H,
HO—[PO]$_{70}$—H,
HO—[EO]$_4$—[PO]$_{30}$—H,
HO—[EO]$_{25}$—[PO]$_{35}$—H,
HO—[PO]$_{30}$—H,
CH$_2$=CHCH$_2$O—[EO]$_{32}$—[PO]$_8$—H,
CH$_2$=CHCH$_2$O—[EO]$_{22}$—[PO]$_{22}$—C$_4$H$_9$,
CH$_2$=CHCH$_2$O—[EO]$_{10}$—CH$_3$
(where, in each formula above EO represents an ethyleneoxy unit expressed by C$_2$H$_4$O, preferably an ethyleneoxy unit expressed by CH$_2$CH$_2$O. PO represents a propyleneoxy unit expressed by C$_3$H$_6$O, and may be a propyleneoxy unit preferably expressed by either CH$_2$CH(CH$_3$)O or CH$_2$CH$_2$CH$_2$O.);
or sorbitan fatty acid ester, glycerol fatty acid ester, polyglycerol fatty acid ester, propylene glycol fatty acid ester, sucrose fatty acid ester, polyoxyethylene alkyl ether, polyoxyethylene oxypropylene alkyl ether, polyoxyethylene fatty acid ester, polyoxyethylene sorbitan fatty acid ester, polyoxyethylene glycerin fatty acid ester, polyoxyethylene propylene glycol fatty acid ester, polyoxyethylene castor oil, polyoxyethylene hydrogenated castor oil, and other nonionic surfactants.

The polyoxyalkylene polymer is added in order to enhance the dispersibility of the silicone-based anti-foaming agent oil compound, and may be used alone or as a mixture of two or more. However, the amount thereof is preferably 0 to 95 mass %, and more preferably 0 to 70 mass %, based on the entire silicone anti-foaming agent composition If the amount is too high, the anti-foaming performance of the anti-foaming agent composition may deteriorate. Note that when added, an effective amount can be used, but it is preferably added in an amount of 20 mass % or more.

Furthermore, a nonionic surfactant is added in order to enhance the dispersibility of the silicone-based anti-foaming agent oil compound, and may be used alone or as a mixture of two or more. However, the amount thereof is preferably 0 to 95 mass %, and more preferably 0 to 70 mass %, based on the entire silicone anti-foaming agent composition If the amount is too high, the anti-foaming performance of the anti-foaming agent may deteriorate. Note that when added, an effective amount can be used, but it is preferably added in an amount of 20 mass % or more.

In addition, the amount of the silicone-based anti-foaming agent oil compound is preferably 5 to 80 mass % of the entire silicone anti-foaming agent composition, more preferably 10 to 70 mass %, and even more preferably 20 to 60 mass %. If the amount of the silicone-based anti-foaming agent oil compound is too small, the anti-foaming performance as the anti-foaming agent composition may be inferior, and if the amount is too high, it may not be possible to satisfy an objective of increasing the dispersibility of the silicone-based anti-foaming agent oil compound.

For the silicone anti-foaming agent composition, a necessary amount of water must be added to emulsify the components such as the silicone-based anti-foaming agent oil compound, the polyorganosiloxane polymer crosslinked product having a polyoxyalkylene group, the polyoxyalkylene polymer, the nonionic surfactant, and the like. The amount is the remainder of the total amount of each component, preferably 50 to 2,000 parts by mass, and more preferably 80 to 400 parts by mass relative to a total of 100 parts by mass of each component.

Note that the silicone anti-foaming agent composition can be prepared by mixing prescribed amounts of each component other than water, and then stirring and emulsifying using a known method such as a homomixer, homogenizer, colloid mill, or other mixer/disperser while heating as necessary. However, in particular, after uniformly mixing and dispersing prescribed amounts of each component other than water, it is preferable to add a part of the water, stir and emulsify, then add the remaining water, and then uniformly stir and mix.

In addition, a small amount of preservative and disinfectant may optionally be added to the silicone anti-foaming agent composition for the purpose of preservation. Specific examples of the preservatives/disinfectants include sodium hypochlorite, sorbic acid, potassium sorbate, salicylic acid, sodium salicylate, benzoic acid, sodium benzoate, parabens, isothiazoline compounds, and the like. The added amount is preferably 0 to 0.5 mass %, and particularly preferably 0.005 to 0.5 mass % of the entire silicone anti-foaming agent composition.

In addition, a small amount of a thickening agent may optionally be added to the silicone anti-foaming agent composition for the purpose of increasing viscosity. Specific examples of the thickening agent include polyacrylic acids, sodium polyacrylate, acrylic acid/methacrylic acid copolymers, sodium carboxymethylcellulose, methylcellulose, hydroxypropyl methylcellulose, hydroxyethyl methylcellulose, xanthan gum, guar gum, and the like. The added amount is preferably 0 to 1.0 mass %, and particularly preferably 0.01 to 0.5 mass % of the entire silicone anti-foaming agent composition.

The particle diameter of the silicone anti-foaming agent composition is preferably 0.1 to 10 μm, more preferably 0.5 to 8 μm, and even more preferably 0.7 to 6 μm. The particle diameter of the emulsion is defined as the median size (particle diameter corresponding to 50% of the cumulative distribution, based on quantity), which can be measured by a laser diffraction particle diameter distribution analyzer.

The silicone anti-foaming agent composition of the present invention can favorably be used in: cutting oils, grinding oils, plastic working oils, heat treatment oils, electric discharge machining oils, and other metalworking oils; gasoline engine oils, diesel engine oils, gas engine oils, and other engine oils; automatic transmission oils, manual transmission oils, and other automotive gear oils; industrial gear oils; turbine oils; bearing oils; anti-rust oils; and the like.

EXAMPLES

The present invention will be described in detail below based on examples, but the present invention is not limited to the following examples.

[Viscosity measurement]

Using a rotational viscometer (manufactured by SHIBAURA SEMTEK CO., LTD., product name: Vismetron VDA-2), measurement was performed on rotor No. 4 at a rotational speed of 12 rpm.

[Measurement of average particle diameter]

A self-emulsifying compound was dispersed in water and measured using a laser diffraction particle diameter distribution analyzer (LS-230 of Beckman Coulter) and the median diameter (particle diameter corresponding to 50% of the cumulative distribution, 50% particle diameter) was used as the average particle diameter.

[Evaluation of anti-foaming performance]

NS Cut S-20 (soluble-type water-soluble cutting liquid, 20% active component, manufactured by NS Chemical Co., Ltd.) diluted 4 times with tap water and temperature-controlled to 23° C. was used as a foaming liquid used for antifoaming performance evaluation. The viscosity of the foaming liquid at this time was 3.5 mPa·s. The anti-foaming agent to be evaluated was added at 25 ppm based on solid content.

400 g of the foaming liquid described above was added to a 1000 mL tall beaker, and stirred at 8000 rpm for 10 minutes using a homomixer (manufactured by Primix Co., Ltd., model HV-M) to cause foaming. Herein, the height of a baffle was 10 cm from the bottom of the homomixer and 11 cm from the bottom of the flask. After stopping the stirring, a foam layer was formed on an upper layer of a liquid portion, and a change in the thickness of the foam layer over time was measured. The time required for the thickness of the foam layer to decrease to 4 mm was defined as t (minutes), and evaluations were made as shown in the table below.

TABLE 1

| Evaluation of anti-foaming performance | |
|---|---|
| Anti-foaming performance | Time |
| ◯ | t < 3 |
| ⊚ | 3 ≤ t < 5 |
| Δ | 5 ≤ t < 6 |
| X | t ≥ 6 |

In order to confirm the retention of the anti-foaming performance, this operation was repeated four times and the anti-foaming performance was evaluated each time.

[Production Example 1]

12.59 g of component (a) of a straight-chain organopolysiloxane expressed by the following chemical formula 1, where j=110 and k=10, and 4.57 g of component (b) of a straight-chain organopolysiloxane expressed by the following chemical formula 2, where m=290, were heated and mixed at 60° C. After mixing uniformly, 0.002 g of chloroplatinic acid and 0.15 g of isopropyl alcohol were mixed therein and allowed to react at 60° C. for 3 hours, and a transparent viscous liquid was obtained. 0.01 g of sodium acetate and 82.84 g of ethylene oxide, 22 mol of propylene oxide, and 22 mol of hydrogen-terminated allyl polyether were added to the obtained viscous liquid and reacted for 3 hours while maintaining the temperature at 80 to 90° C. After the reaction, the isopropyl alcohol in the viscous liquid was removed by heating at 80° C. for 1 hour under reduced pressure. A brown viscous liquid was obtained.

[Formula 7]

Chemical formula 1

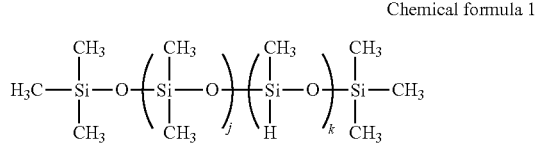

Chemical formula 2

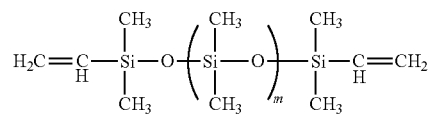

[Production Example 2]

12.20 g of component (a) of a straight-chain organopolysiloxane expressed by chemical formula 1 described above, where j=110 and k=10, 7.51 g of component (b) of a straight-chain organopolysiloxane expressed by chemical formula 2 described above, where m=493, and 20.00 g of toluene were heated and mixed at 60° C. After mixing uniformly, 0.002 g of chloroplatinic acid and 0.15 g of isopropyl alcohol were mixed therein and allowed to react at 60° C. for 3 hours, and a transparent viscous liquid was obtained. 0.01 g of sodium acetate and 80.29 g of ethylene oxide: 22 mol of propylene oxide: and 22 mol of hydrogen-terminated allyl polyether were added to the obtained viscous liquid and reacted for 3 hours while maintaining the temperature at 80 to 90° C. After the reaction, the isopropyl alcohol and toluene in the viscous liquid were removed by heating at 100° C. for 3 hours under reduced pressure. A brown viscous liquid was obtained.

[Production Example 3]

11.71 g of component (a) of a straight-chain organopolysiloxane expressed by chemical formula 1 described above, where j=110 and k=10, 11.19 g of component (b) of a straight-chain organopolysiloxane expressed by chemical formula 2 described above, where m=766, and 12.82 g of toluene were heated and mixed at 60° C. After mixing uniformly, 0.002 g of chloroplatinic acid and 0.15 g of isopropyl alcohol were mixed therein and allowed to react at 60° C. for 3 hours, and a transparent viscous liquid was obtained. 0.01 g of sodium acetate and 77.10 g of ethylene oxide: 22 mol of propylene oxide: and 22 mol of hydrogen-terminated allyl polyether were added to the obtained viscous liquid and reacted for 3 hours while maintaining the temperature at 80 to 90° C. After the reaction, the isopropyl alcohol and toluene in the viscous liquid were removed by heating at 100° C. for 3 hours under reduced pressure. A brown viscous liquid was obtained.

Comparative Production Example 1

21.46 g of component (a) of a straight-chain organopolysiloxane expressed by chemical formula 1 above, where j=110 and k=10, and 4.58 g of component (b) of a straight-chain organopolysiloxane expressed by chemical formula 2 above, where m=179, were heated and mixed at 60° C. After mixing uniformly, 0.002 g of chloroplatinic acid and 0.15 g of isopropyl alcohol were mixed therein and allowed to react at 60° C. for 3 hours, and a transparent viscous liquid was obtained. 0.01 g of sodium acetate and 73.80 g of ethylene oxide: 18 mol of propylene oxide: and 18 mol of hydrogen-terminated allyl polyether were added to the obtained viscous liquid and reacted for 3 hours while maintaining the temperature at 80 to 90° C. After the reaction, the isopropyl alcohol in the viscous liquid was removed by heating at 80° C. for 1 hour under reduced pressure. A brown viscous liquid was obtained.

Comparative Production Example 2

12.81 g of component (a) of a straight-chain organopolysiloxane expressed by chemical formula 1 above, where j=110 and k=10, and 2.88 g of component (b) of a straight-chain organopolysiloxane expressed by chemical formula 2 above, where m=179, were heated and mixed at 60° C. After mixing uniformly, 0.002 g of chloroplatinic acid and 0.15 g of isopropyl alcohol were mixed therein and allowed to react at 60° C. for 3 hours, and a transparent viscous liquid was obtained. 0.01 g of sodium acetate and 84.31 g of ethylene oxide: 22 mol of propylene oxide: and 22 mol of hydrogen-terminated allyl polyether were added to the obtained viscous liquid and reacted for 3 hours while maintaining the temperature at 80 to 90° C. After the reaction, the isopropyl alcohol in the viscous liquid was removed by heating at 80° C. for 1 hour under reduced pressure. A brown viscous liquid was obtained.

TABLE 2

Amounts of each component used in Production Examples 1 to 3 and Comparative Production Examples 1 and 2 (unit: g)

Table 2-1

|  | Production Example 1 | Production Example 2 | Production Example 3 |
|---|---|---|---|
| Straight-chain organopolysiloxane expressed by chemical formula 1 (j = 110, k = 10) | 12.59 | 12.20 | 11.71 |
| Straight-chain organopolysiloxane expressed by chemical formula 2 (m = 290) | 4.57 | — | — |
| Straight-chain organopolysiloxane expressed by chemical formula 2 (m = 493) | — | 7.51 | — |
| Straight-chain organopolysiloxane expressed by chemical formula 2 (m = 766) | — | — | 11.19 |
| Straight-chain organopolysiloxane expressed by chemical formula 2 (m = 179) | — | — | — |
| Toluene | — | 20.00 | 23.00 |
| Isopropyl alcohol | 0.15 | 0.15 | 0.15 |
| Chloroplatinic acid | 0.002 | 0.002 | 0.002 |
| Allyl polyether EO-PO    E0/P0 = 22/22 | 82.84 | 80.29 | 77.10 |
| Allyl polyether EO-PO    E0/P0 = 18/18 | — | — | — |
| Sodium acetate | 0.01 | 0.01 | 0.01 |

Table 2-2

|  | Comparative Production Example 1 | Comparative Production Example 2 |
|---|---|---|
| Straight-chain organopolysiloxane expressed by chemical formula 1 (j = 110, k = 10) | 21.46 | 12.81 |
| Straight-chain organopolysiloxane expressed by chemical formula 2 (m = 290) | — | — |
| Straight-chain organopolysiloxane expressed by chemical formula 2 (m = 493) | — | — |
| Straight-chain organopolysiloxane expressed by chemical formula 2 (m = 766) | — | — |
| Straight-chain organopolysiloxane expressed by chemical formula 2 (m = 179) | 4.58 | 2.88 |
| Toluene | — | — |
| Isopropyl alcohol | 0.15 | 0.15 |
| Chloroplatinic acid | 0.002 | 0.002 |
| Allyl polyether EO-PO    E0/P0 = 22/22 | — | 84.31 |
| Allyl polyether EO-PO    E0/P0 = 18/18 | 73.80 | — |
| Sodium acetate | 0.01 | 0.01 |

[Silicone-based anti-foaming agent oil compound #1]

Silicone-based anti-foaming agent oil compound #1 was manufactured by the following method. In other words, 59.10 parts by mass of polydimethylsiloxane blocked with a trimethylsilyl group (viscosity of 1,000 mPa·s at 25° C.), 30.60 parts by mass of polydimethylsiloxane blocked with a silanol group (viscosity of 12,500 mPa·s at 25° C.), and 3.06 parts by mass of polyethyl silicate ("Cilbond 50" manufactured by Evonik) were placed in a three neck flask with a capacity of 1 L provided with a stirrer, a thermometer, a reflux condenser, and a nitrogen gas supply, while stirring, and the temperature was raised to 110° C. A mixture of 1.54 parts by mass of premixed potassium dimethylsilanolate, 5.15 parts by mass of polydimethylsiloxane blocked with a trimethylsilyl group (viscosity of 1,000 mPa·s at 25° C.), and 0.08 parts by mass of ethanol was added at 110° C. and stirring was continued for 30 minutes at 110° C. Next, silica ("Aerosil 200", specific surface area: 200 $m^2/g$, manufactured by Evonik) was added, and then homogeneously dispersed using a homomixer for 30 minutes while heating at 110° C. A mixture of 0.02 parts by mass of polyether-modified silicone 501W and 0.13 parts by mass of ion exchanged water was added. After stirring, 5.15 parts by mass of polydimethylsiloxane blocked with a silanol group (viscosity of 40 mPa·s at 25° C.) was added, and the temperature raised to 190° C. 1.05 parts by mass of potassium dimethylsilanolate catalyst was added and allowed to react at 190° C. for 1 hour. The obtained reaction product was neutralized, then 0.02 parts by mass of polyether-modified silicone 501W and 1.83 parts by mass of ion exchanged water were added, to obtain a silicone-based anti-foaming agent oil compound. All steps were performed under a nitrogen gas purge. The obtained silicone-based anti-foaming agent oil compound had a viscosity of 15,000 mPa·s.

Example 1

After mixing 45 parts by mass of a polyorganosiloxane polymer crosslinked product having a polyoxyalkylene group manufactured in Production Examples 1 to 3 and Comparative Production Examples 1 and 2 and 25 parts by mass of an EOPOEO copolymer (ADEKA Pluronic (registered trademark) L-31), 30 parts by mass of the silicone-based anti-foaming agent oil compound #1 above was added and a homomixer was used to obtain a self-emulsifying anti-foaming agent composition. The diluted appearance of the resulting anti-foaming agent composition was a slightly bluish emulsion.

Examples 2 and 3 and Comparative Examples 1 and 2

Anti-foaming agent compositions were prepared by the same procedure as in Example 1, except that the polyorganosiloxane polymer crosslinked product having a polyoxyalkylene group was changed as shown in Table 3. The diluted appearance of the resulting anti-foaming agent composition was a slightly bluish emulsion.

TABLE 3

Anti-foaming agents of Examples 1 to 3 and Comparative Examples 1 and 2, and anti-foaming retention (unit of each component: g)

Table 3-1

|  | Example 1 | Example 2 | Example 3 |
|---|---|---|---|
| Polyorganosiloxane polymer crosslinked product of Production Example 1 | 45 | — | — |
| Polyorganosiloxane polymer crosslinked product of Production Example 2 | — | 45 | — |
| Polyorganosiloxane polymer crosslinked product of Production Example 3 | — | — | 45 |
| Polyorganosiloxane polymer crosslinked product of Comparative Production Example 1 | — | — | — |
| Polyorganosiloxane polymer crosslinked product of Comparative Production Example 2 | — | — | — |
| Silicone-based anti-foaming agent oil compound #1 | 30 | 30 | 30 |
| EOPOEO copolymer (Adeka Pluronic L-31) | 25 | 25 | 25 |
| Anti-foaming retention 1 time | ◎ | ◎ | ◎ |
| Anti-foaming retention 2 times | ○ | ○ | ◎ |
| Anti-foaming retention 3 times | ○ | ○ | ○ |
| Anti-foaming retention 4 times | Δ | ○ | ○ |

Table 3-2

|  | Comparative Example 1 | Comparative Example 2 |
|---|---|---|
| Polyorganosiloxane polymer crosslinked product of Production Example 1 | — | — |
| Polyorganosiloxane polymer crosslinked product of Production Example 2 | — | — |
| Polyorganosiloxane polymer crosslinked product of Production Example 3 | — | — |
| Polyorganosiloxane polymer crosslinked product of Comparative Production Example 1 | 45 | — |
| Polyorganosiloxane polymer crosslinked product of Comparative Production Example 2 | — | 45 |
| Silicone-based anti-foaming agent oil compound #1 | 30 | 30 |
| EOPOEO copolymer (Adeka Pluronic L-31) | 25 | 25 |
| Anti-foaming retention 1 time | ○ | ○ |
| Anti-foaming retention 2 times | ○ | Δ |
| Anti-foaming retention 3 times | Δ | Δ |
| Anti-foaming retention 4 times | X | X |

As can be seen from Table 3 summarizing the results of each example and comparative example, when using the silicone anti-foaming agent composition containing the polyorganosiloxane polymer crosslinked product having a polyoxyalkylene group containing moiety structures (I) and (II) of the present invention, the anti-foaming speed is fast from the first time, and anti-foaming properties are superior. In addition, it was found practical anti-foaming properties could be obtained even after repeating the test four times. On the other hand, in the comparative examples having a low number of repetitions of siloxane units in moiety structure (I), it was found that a sufficient anti-foaming speed was not obtained, and that the anti-foaming properties were lowered for repeated tests. These results suggest that the polyorganosiloxane polymer crosslinked product having a polyoxyalkylene group shown in the examples improves the performance of the anti-foaming agent against dilution and shear forces, and is expected to improve anti-foaming retention.

[Silicone-based anti-foaming agent oil compound #2]

59.1 parts by mass of polydimethylsiloxane blocked with a trimethylsilyl group (viscosity of 5,000 mPa·s at 25° C.), 30.60 parts by mass of polydimethylsiloxane blocked with a silanol group (viscosity of 12,500 mPa·s at 25° C.), and 3.06 parts by mass of polyethyl silicate ("Cilbond 50" manufactured by Evonik) were placed in a three neck flask with a capacity of 1 L provided with a stirrer, a thermometer, a reflux condenser, and nitrogen gas supply, while stirring, and the temperature was raised to 110° C. A mixture of 1.54 parts by mass of premixed potassium dimethylsilanolate, 5.15 parts by mass of polydimethylsiloxane blocked with a trimethylsilyl group (viscosity of 5,000 mPa·s at 25° C.), and 0.08 parts by mass of ethanol was added at 110° C. and stirring was continued for 30 minutes at 110° C. Next, silica ("Aerosil 200", specific surface area: 200 m²/g, manufactured by Evonik) was added, and then homogeneously dispersed using a homomixer for 30 minutes while heating at 110° C. A mixture of 0.1 parts by mass of polyether-modified silicone 501W and 0.13 parts by mass of ion exchanged water was added. After stirring, 5.15 parts by mass of polydimethylsiloxane blocked with a silanol group (viscosity of 40 mPa·s at 25° C.) was added, and the temperature raised to 190° C. 1.25 parts by mass of potassium dimethylsilanolate catalyst and allowed to react at 190° C. for 1 hour. The obtained reaction product was neutralized, then 0.02 parts by mass of polyether-modified silicone 501W and 2.19 parts by mass of ion exchanged water were added, to obtain a silicone-based anti-foaming agent oil compound. All steps were performed under a nitrogen gas purge. The obtained silicone-based anti-foaming agent oil compound had a viscosity of 33,500 mPa·s.

Examples 4 to 6

As shown in Table 4, anti-foaming agent compositions for Examples 4 to 6 were prepared by the same procedure as in Example 1, except that the silicone-based anti-foaming agent oil compound #2 above was used instead of the silicone-based anti-foaming agent oil compound #1. The evaluation results are shown in Table 4.

TABLE 4

Anti-foaming agents of Examples 4 to 6, particle diameter and anti-foaming retention (unit of each component: g)

|  | Example 4 | Example 5 | Example 6 |
|---|---|---|---|
| Silicone-based anti-foaming agent oil compound #2 | 30 | 30 | 30 |
| Polyorganosiloxane polymer crosslinked product of Production Example 1 | 45 | — | — |
| Polyorganosiloxane polymer crosslinked product of Production Example 2 | — | 45 | — |
| Polyorganosiloxane polymer crosslinked product of Production Example 3 | — | — | 45 |
| EOPOEO copolymer (Adeka Pluronic L-31) | 25 | 25 | 25 |

TABLE 4-continued

Anti-foaming agents of Examples 4 to 6, particle diameter and anti-foaming retention (unit of each component: g)

| | Example 4 | Example 5 | Example 6 |
|---|---|---|---|
| Emulsion particle diameter after emulsification (um) | 1.5 | 1.2 | 1.0 |
| Anti-foaming retention 1 time | ⊚ | ⊚ | ⊚ |
| Anti-foaming retention 2 times | ⊚ | ⊚ | ⊚ |
| Anti-foaming retention 3 times | ○ | ○ | ○ |
| Anti-foaming retention 4 times | ○ | ○ | ○ |

When the polyorganosiloxane polymer crosslinked product of the present invention is used together with the silicone-based anti-foaming agent oil compound #2, which is a trimethylsilyl group-terminated polydimethylsiloxane with a slightly longer chain length (viscosity of 5,000 mPa·s at 25° C.), the anti-foaming retention is even more favorable, as shown in Table 4 (Examples 4 to 6), in addition to improved dilution stability against shear stress. Moreover, in the present invention, it is expected that more favorable anti-foaming properties can be achieved by using the anti-foaming agent oil compound according to the present invention in combination with a polyorganosiloxane polymer crosslinked product having a polyoxyalkylene group having an optimized structure.

The invention claimed is:

1. A silicone anti-foaming agent composition, comprising a polyorganosiloxane polymer crosslinked product having a polyoxyalkylene group, which includes:

moiety structure (I):

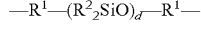

where $R^1$ represents an alkylene group having 2 to 20 carbon atoms bonded to a silicon atom on the polysiloxane chain, $R^2$ represents a monovalent hydrocarbon group, and d is a number in the range of 200 to 1,000; and moiety structure (II):

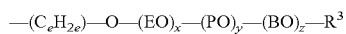

where
EO represents an ethyleneoxy unit expressed by $C_2H_4O$,
PO represents a propyleneoxy unit expressed by $C_3H_6O$,
BO represents a butyleneoxy unit expressed by $C_4H_8O$,
a single bond on the left end is bonded to a silicon atom on the polysiloxane chain,
$R^3$ represents a hydrogen atom, an alkyl group, an aryl group, or an acyl group,
e is a number ranging from 2 to 10,
(x+y+z) is a number ranging from 40 to 100,
x is a number ranging from 15 to 50,
y is a number ranging from 15 to 50, and
z is a number ranging from 0 to 50.

2. The silicone anti-foaming agent composition according to claim 1, wherein d in moiety structure (I) is a number ranging from 250 to 900.

3. The silicone anti-foaming agent composition according to claim 1, wherein in moiety structure (II), x is a number ranging from 20 to 40, y is a number ranging from 20 to 40, and z is zero.

4. The silicone anti-foaming agent composition according to claim 1, wherein
the polyorganosiloxane polymer crosslinked product having a polyoxyalkylene group is expressed by the following structural formula:

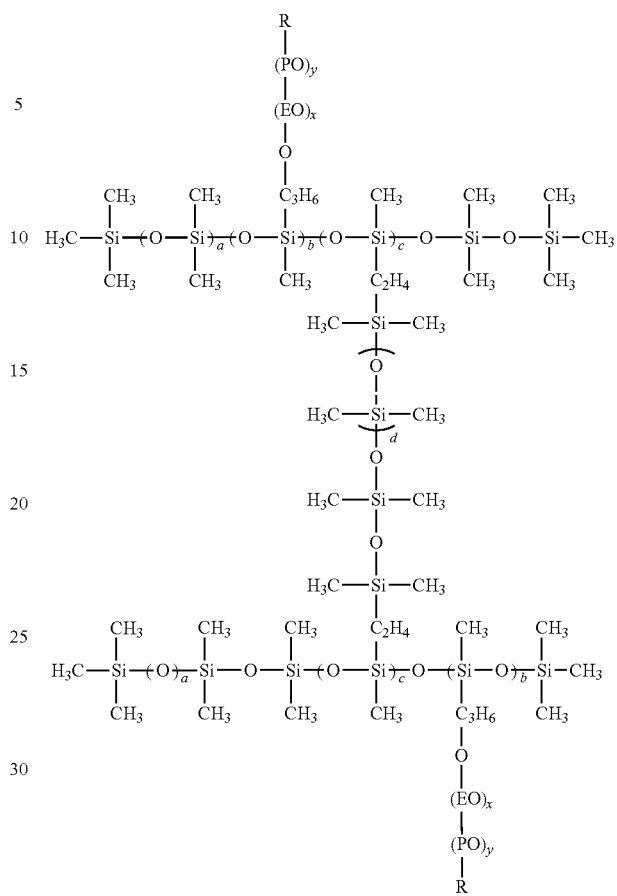

where
a is a number ranging from 10 to 200,
(b+c) is a number ranging from 2 to 50,
b and c are each a number ranging from 1 or more,
EO and PO are as described above,
R represents a hydrogen atom, an alkyl group, an aryl group or an acyl group, and
d, x and y are as defined in the moiety structures (I) and (II).

5. The silicone anti-foaming agent composition according to claim 1, further comprising a silicone-based anti-foaming agent oil compound, wherein the silicone-based anti-foaming agent oil composition comprises:

(A) an essentially hydrophobic organopolysiloxane having a viscosity of 10 to 100,000 mPa·s at 25° C.: 20 to 80 parts by mass;

(B) a hydrophobic organopolysiloxane or a cyclic organopolysiloxane containing silanol groups at least at both ends: 20 to 80 parts by mass;

(C) a silane or silane condensation product: 1 to 10 parts by mass; and (D) a fine powder silica having a specific surface area of 50 m²/g or more: 2 to 10 parts by mass;

wherein the total amount of (A) and (B) is 100 parts by mass.

6. The silicone anti-foaming agent composition according to claim 5, wherein component (B) includes:

(B1) a hydrophobic organopolysiloxane containing a silanol group at both ends and having a viscosity of 1000 to 10,000,000 mPa·s; and (B2) a hydrophobic organopolysiloxane or cyclic siloxane containing silanol groups at both ends and having a viscosity of 1 to 1000 mPa·s.

7. The silicone anti-foaming agent composition according to claim 5, wherein the molar ratio of component (B) relative to the total amount of component (A) and component (B) is 0.7 or more.

8. The silicone anti-foaming agent composition according to claim 6, wherein the molar ratio of component (B1) relative to the total amount of component (A) and component (B1) is 0.2 or more.

9. The silicone anti-foaming agent composition according to claim 5, wherein the silicone-based anti-foaming agent oil composition is emulsified by the polyorganosiloxane polymer crosslinked product having a polyoxyalkylene group.

10. The silicone anti-foaming agent composition according to claim 1, wherein the viscosity of the silicone-based anti-foaming agent oil composition at 25° C. is 10,000 to 1,000,000 mPa·s.

11. The silicone anti-foaming agent composition according to claim 9, wherein the emulsion particle diameter is 0.1 to 10 μm.

12. A metalworking oil comprising the silicone anti-foaming agent composition according to claim 1.

* * * * *